US008424761B2

(12) United States Patent
Yanagi

(10) Patent No.: US 8,424,761 B2
(45) Date of Patent: Apr. 23, 2013

(54) COMMODITY CODE READING APPARATUS AND COMMODITY CODE READING METHOD

(75) Inventor: Toshio Yanagi, Saitama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 46 days.

(21) Appl. No.: 13/217,811

(22) Filed: Aug. 25, 2011

(65) Prior Publication Data

US 2012/0055994 A1 Mar. 8, 2012

(30) Foreign Application Priority Data

Sep. 2, 2010 (JP) ................................ 2010-197127

(51) Int. Cl.
*G06K 15/00* (2006.01)
*G06Q 30/00* (2006.01)
*G06F 19/00* (2006.01)

(52) U.S. Cl.
USPC .......................................... 235/383; 235/385

(58) Field of Classification Search .................. 235/383, 235/385; 705/16, 22, 28
See application file for complete search history.

(56) References Cited

U.S. PATENT DOCUMENTS

| | | | | |
|---|---|---|---|---|
| 6,641,042 | B1 * | 11/2003 | Pierenkemper et al. | 235/462.01 |
| 7,185,812 | B2 * | 3/2007 | Wong et al. | 235/385 |
| 7,413,122 | B2 * | 8/2008 | Murofushi et al. | 235/383 |
| 2005/0127176 | A1 * | 6/2005 | Dickinson et al. | 235/385 |
| 2006/0219782 | A1 * | 10/2006 | Wong et al. | 235/385 |
| 2006/0261158 | A1 * | 11/2006 | Baker et al. | 235/383 |

FOREIGN PATENT DOCUMENTS

| | | |
|---|---|---|
| JP | 2008-033640 | 2/2008 |
| JP | 2008-134731 | 6/2008 |
| JP | 2009-289286 | 12/2009 |

OTHER PUBLICATIONS

Japanese Office Action for Japanese Application No. 2010-197127 mailed on Oct. 23, 2012.

* cited by examiner

*Primary Examiner* — Jamara Franklin
(74) *Attorney, Agent, or Firm* — Turocy & Watson, LLP

(57) ABSTRACT

According to one embodiment, a commodity code reading apparatus includes: an image capturing section configured to capture an image picked up by an image pickup section; a code detecting section configured to detect a code symbol from an image of a commodity captured by the image capturing section; a label detecting section configured to detect a label affixed to the commodity from the image of the commodity captured by the image capturing section; a determining section configured to determine whether a relative positional relation between a detection position of the code symbol and a detection position of the label in the image coincides with a positional relation set in advance; and a transmitting section configured to transmit, if the determining section determines that the positional relations coincide with each other, code information stored in the code symbol to an external apparatus together with label information corresponding to the label.

10 Claims, 7 Drawing Sheets

FIG.5
FIG.6
217b
| No | LABEL CHARACTERISTIC DATA | BENEFIT INFORMATION |
|---|---|---|
| 1 | 0.5, US$, OFF | -US$ 0.5 |
| 2 | 10, %, OFF | -10% |
| 3 | 10, POINTS | +10P |
| ⋮ | ⋮ | ⋮ |
FIG.7
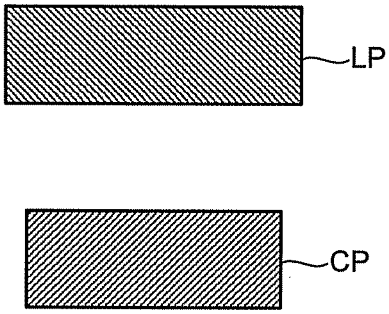

COMMODITY CODE READING APPARATUS AND COMMODITY CODE READING METHOD

CROSS-REFERENCE TO RELATED APPLICATIONS

This application is based upon and claims the benefit of priority from the prior Japanese Patent Application No. 2010-197127, filed on Sep. 2, 2010; the entire contents of which are incorporated herein by reference.

FILED

Embodiments described herein relate generally to a commodity code reading apparatus and a commodity code reading method.

BACKGROUND

In the past, in a retail store such as a supermarket, in order to reduce disposal losses of perishables, commodities are sold at discounted prices when the closing time approaches. In this case, the store affixes a label on which benefit content related to commodity purchase such as a discount amount is indicated (hereinafter referred to as benefit indication label) to a predetermined position of a commodity to clearly indicate to customers that the commodity is a discount target commodity. When a benefit indication label is affixed to a commodity to be purchased by a customer, an operator of a POS (Point Of Sales) terminal reads a barcode of the commodity with a scanner and operates a keyboard, a touch panel, or the like to provide a benefit (a discount, etc.) corresponding to the benefit indication label.

Concerning reading of a barcode, there is known a technique for picking up an image of a barcode and a benefit indication label using an image sensor such as a CCD (Charge Coupled Device) and outputting information concerning a commodity code, a discount, and the like read from the picked-up image to a POS terminal to automatically perform discount processing in the POS terminal.

However, in the related art explained above, if a false benefit indication label is affixed to an irregular position by a malicious customer or the like, it is likely that the benefit indication label is processed as a regular benefit indication label.

DESCRIPTION OF THE DRAWINGS

FIG. 5 is a diagram of still another example of the benefit indication label;

FIG. 6 is a diagram for explaining a label characteristic file;

FIG. 7 is a schematic diagram of a positional relation defined in an affixing position definition file;

DETAILED DESCRIPTION

In general, according to one embodiment, a commodity code reading apparatus includes an image capturing section, a code detecting section, a label detecting section, a determining section, and a transmitting section. The image capturing section captures an image picked up by an image pickup section. The code detecting section detects a code symbol from an image of a commodity captured by the image capturing section. The label detecting section detects a label affixed to the commodity from the image of the commodity captured by the image capturing section. The determining section determines whether a relative positional relation between a detection position of the code symbol and a detection position of the label in the image coincides with a positional relation set in advance. The transmitting section transmits, if the determining section determines that the positional relations coincide with each other, code information stored in the code symbol to an external apparatus together with label information corresponding to the label.

A commodity code reading apparatus and a computer program according to an embodiment are explained below with reference to the accompanying drawings using a checkout system as an example. In this embodiment, an example in which the commodity code reading apparatus and the computer program are applied to a checkout system installed in a store such as a restaurant or a supermarket is explained.

Figure 1:
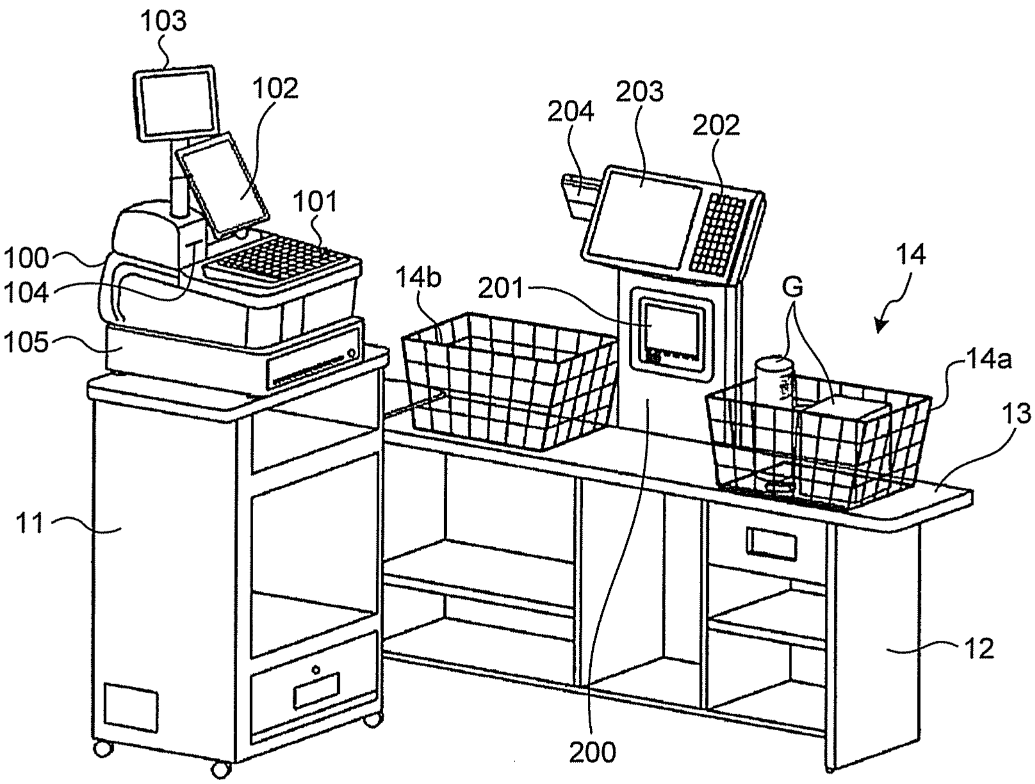
FIG. 1 is a schematic perspective view of the configuration of a checkout system.

FIG. 1 is a schematic perspective view of the configuration of a checkout system according to an embodiment. As shown in FIG. 1, the checkout system includes a POS terminal 100 and a commodity code reading apparatus 200.

The POS terminal 100 is a commodity information processing apparatus for performing sales registration of commodities to be purchased by a customer and is placed on a checkout table 11. The POS terminal 100 includes a keyboard 101, an operator display 102, a customer display 103, a printer 104, and a drawer 105. The sections included in the POS terminal 100 are explained later.

A counter table 12 having a laterally long table shape is arranged to form an L-shape with the checkout table 11. A loading surface 13 is formed on the upper surface of the counter table 12. The commodity code reading apparatus 200 is placed on the loading surface 13 and is connected to the POS terminal 100 by wire or radio to be capable of communicating with the POS terminal 100.

The commodity code reading apparatus 200 is an apparatus for reading a barcode affixed to a commodity and transmitting (outputting) a commodity code stored in the barcode to the POS terminal 100. As shown in FIG. 1, the commodity code reading apparatus 200 includes a reading window 201, a keyboard 202, an operator display 203, and a customer display 204. The sections included in the commodity code reading apparatus 200 are explained later.

A shopping basket 14 including commodities G affixed with code labels and benefit indication labels explained later is placed on the loading surface 13. The shopping basket 14 is classified into a first shopping basket 14*a* carried in by a customer and a second shopping basket 14*b* placed in a position across the commodity code reading apparatus 200 from the first shopping basket 14*a*.

The commodities G purchased in one transaction are stored in the first shopping basket 14*a* carried in by the customer. Code labels representing code symbols such as barcodes or two-dimensional codes and benefit indication labels explained later representing benefit content related to commodity purchase such as a discount or point addition are affixed to the commodities G. Commodity codes concerning the commodities G are stored in the code symbols in an encoded state. The commodity codes are codes allocated to the commodities G in order to specify the commodities G. Examples of the commodity codes include a JAN (Japan Article Number) code, a UPC (Universal Product Code) code, and an EAN (European Article Number) code.

The commodities G in the first shopping basket 14*a* are moved to the second shopping basket 14*b* by an operator who operates the commodity code reading apparatus 200. In this moving process, the code labels and the benefit indication labels are faced to the reading window 201 of the commodity code reading apparatus 200. When the code labels and the benefit indication labels are faced to the reading window 201, an image pickup section 216 (see FIG. 2) explained later provided in the reading window 201 picks up images of the code symbols and the benefit indication labels.

The commodity code reading apparatus 200 detects the code symbols included in the images picked up by the image pickup section 216 and decodes the code symbols to read commodity codes concerning the commodities G. In this embodiment, an example in which a barcode is used as a code symbol is explained. However, the code symbol is not limited to this and a two-dimensional code may be used.

Figure 2:
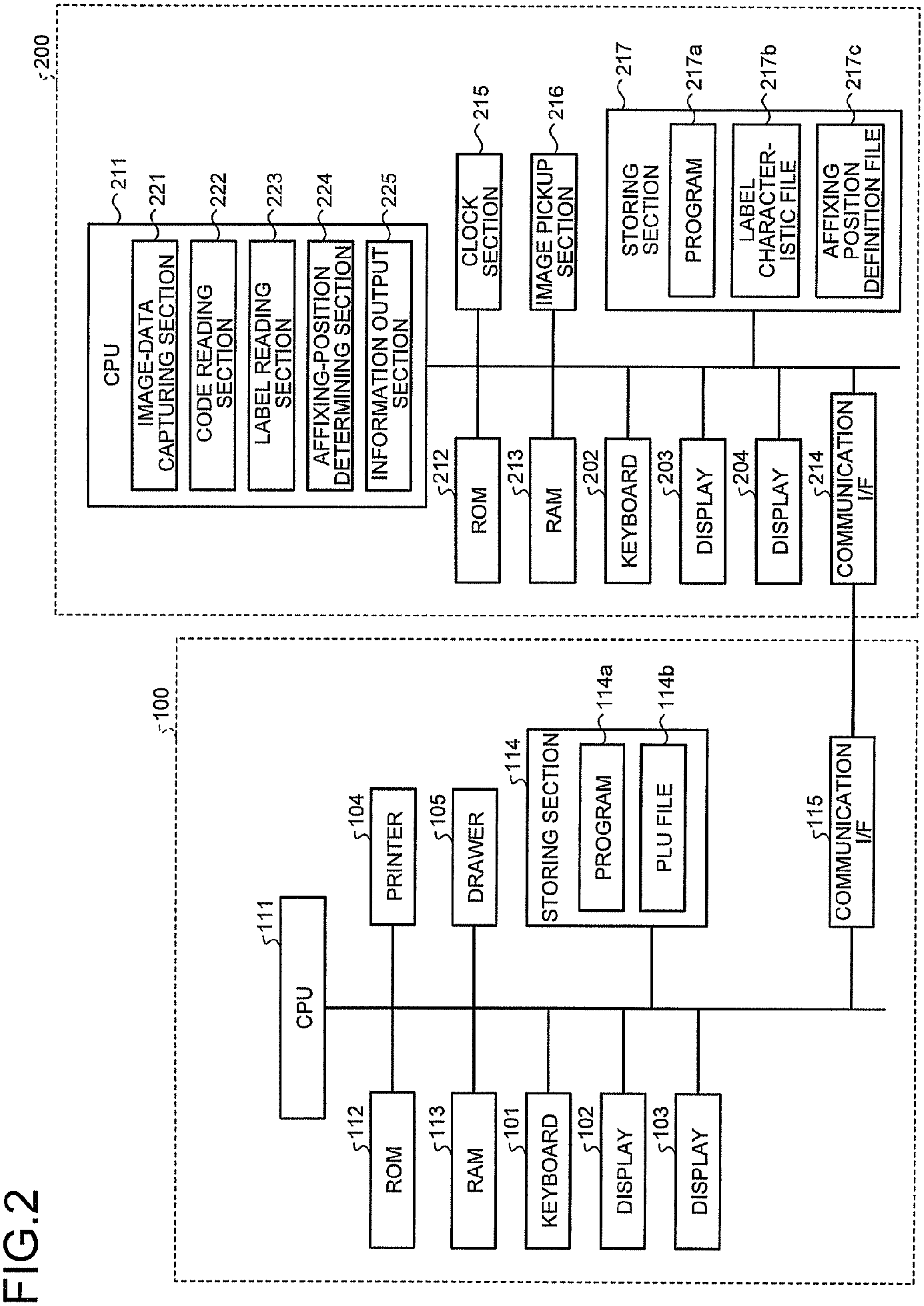
FIG. 2 is a block diagram of the configurations of a POS terminal and a code reading apparatus.

The configuration of the checkout system is explained below with reference to FIG. 2. FIG. 2 is a block diagram of the configurations of the POS terminal 100 and the commodity code reading apparatus 200.

As shown in FIG. 2, the POS terminal 100 includes a CPU (Central Processing Unit) 111, a ROM (Read Only Memory) 112, and a RAM (Random Access Memory) 113.

The CPU 111 executes various computer programs stored in the ROM 112 and a storing section 114 explained later to thereby control the POS terminal 100. The ROM 112 has stored therein a computer program for performing a basic operation. The RAM 113 is a main storage of the POS terminal 100 and functions as a work area of the CPU 111.

The keyboard 101, the displays 102 and 103, the printer 104, and the drawer 105 are connected to the CPU 111 via various input and output circuits (not shown).

The keyboard 101 is an input device configured to notify the CPU 111 of information of a key (hereinafter referred to as key information) input from an operator who operates the POS terminal 100. Various operation keys such as a ten key for inputting a number and an operator and a closing key necessary for settlement of a commodity price are disposed on the keyboard 101.

The displays 102 and 103 include display devices such as LCDs (Liquid Crystal Displays) and display various kinds of information such as a name and a price of a commodity on the basis of an instruction of the CPU 111. The display 102 is a display for the operator who operates the POS terminal 100. A display surface of the display 102 is arranged to be faced to the operator (see FIG. 1). The display 103 is a display for a customer. A display surface of the display 103 is arranged to be faced to the customer (see FIG. 1). The display 102 may be configured as a touch panel to realize all or a part of the keys of the keyboard 101 on the touch panel.

The printer 104 is a printing apparatus such as a thermal printer. The printer 104 prints a receipt, a journal, or the like according to the control by the CPU 111. The drawer 105 is a cash drawer for storing cash and the like. The drawer 105 opens and closes according to the control by the CPU 111.

The storing section 114 and a communication I/F (interface) 115 are connected to the CPU 111 via various input and output circuits (not shown)

The storing section 114 is a storage medium such as a HDD (Hard Disk Drive) or a flash memory. The storing section 114 has stored therein a computer program 114*a* executable by the CPU 111 and various files. Examples of the computer program 114*a* stored in the storing section 114 include a computer program for sales registration processing for commodities. Examples of the files stored in the storing section 114 include a PLU (Price Look Up) file 114*b*. The PLU file 114*b* is a file for managing commodity codes uniquely allocated to commodities and information concerning the commodities such as names, prices, and commodity classifications of the commodities in association with each other.

The communication I/F 115 is an interface for performing data communication with the commodity code reading apparatus 200. The CPU 111 transmits and receives various data to and from the commodity code reading apparatus 200 via the communication I/F 115.

On the other hand, the commodity code reading apparatus 200 includes a CPU 211, a ROM 212, and a RAM 213.

The CPU 211 executes various computer programs stored in the ROM 212 and a storing section 217 explained later to thereby collectively control the commodity code reading apparatus 200. The ROM 212 has stored therein a computer program for performing a basic operation. The RAM 213 is a main storage of the commodity code reading apparatus 200 and functions as a work area of the CPU 211.

The keyboard 202 and the displays 203 and 204 are connected to the CPU 211 via various input and output circuits (not shown).

The keyboard 202 is an input device configured to notify the CPU 211 of key information input from the operator who operates the commodity code reading apparatus 200. The keyboard 202 is used, for example, in inputting the number of sold items and inputting a commodity code of a commodity, a barcode of which cannot be read.

The displays 203 and 204 include display devices such as LCDs and display various kinds of information such as a name and a price of a commodity on the basis of an instruction of the CPU 211. The display 203 is a display for the operator who operates the commodity code reading apparatus 200. A display surface of the display 203 is arranged to be faced to the operator (see FIG. 1). The display 204 is a display for a customer. A display surface of the display 204 is arranged to be faced to the customer (see FIG. 1). The display 203 may be configured as a touch panel to realize all or a part of the keys of the keyboard 202 on the touch panel.

A communication I/F 214, a clock section 215, an image pickup section 216, and a storing section 217 are connected to the CPU 211 via various input and output circuits (not shown).

The communication I/F 214 is an interface for performing data communication with the POS terminal 100. The CPU 211 transmits and receives various data to and from the POS terminal 100 via the communication I/F 214. The clock section 215 is a clock device such as an RTC (Real Time Clock) and outputs the present date and time (time) to the CPU 211.

The image pickup section 216 is an image sensor such as a CCD (Charge Coupled Device) or a CMOS (Complementary Metal Oxide Semiconductor) and is provided in the reading window 201 shown in FIG. 1. The image pickup section 216 picks up, according to the control by the CPU 211, an image of a code symbol and a benefit indication label affixed to a commodity.

Figure 3:
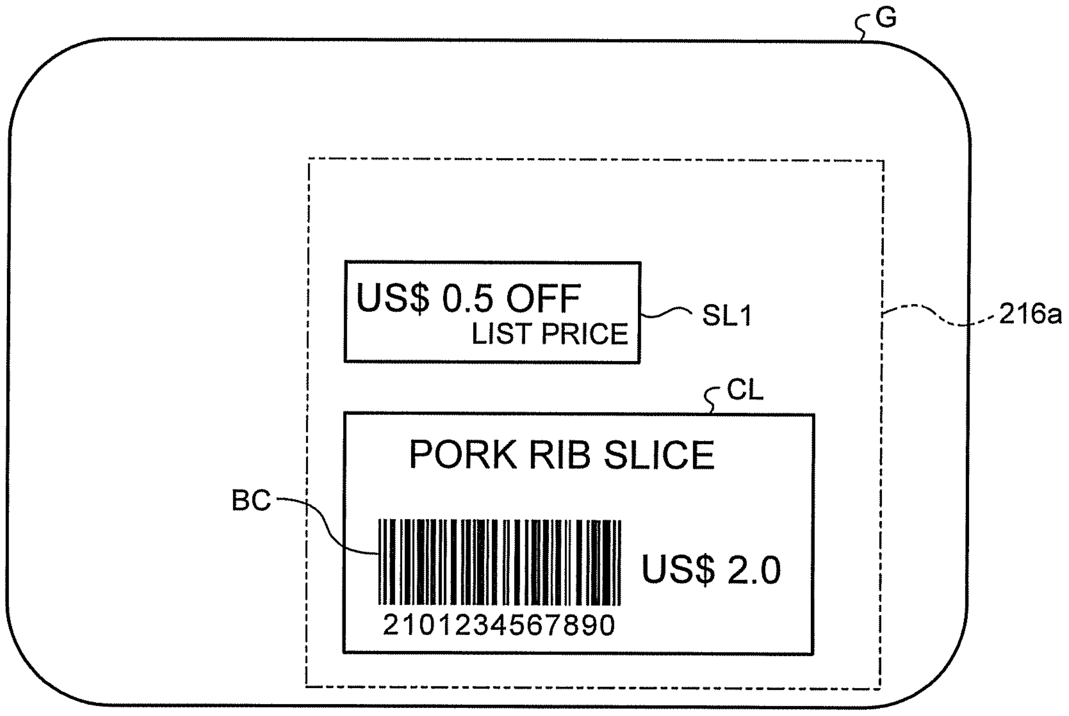
FIG. 3 is a diagram for explaining an example of a relation between an image pickup area of an image pickup section and a commodity.

A relation between an image pickup area of the image pickup section 216 and the commodity G is explained with reference to FIG. 3. FIG. 3 is a diagram of an example of the relation between the image pickup area of the image pickup section 216 and the commodity G. An area surrounded by an alternate long and two short dashes line in the figure is an image pickup area 216*a* that is an area where the image pickup section 216 can pick up an image in one frame. Further, in addition to a code label CL, a discount label SL1, which is an example of a benefit indication label, is affixed to the commodity G shown in FIG. 3.

On the code label CL, besides a commodity name "pork rib slice" and a commodity price "US$2.0", a barcode BC or the like is displayed as a code symbol. Under the barcode BC, a numerical value "2101234567890" of a commodity code incorporated in the barcode BC is displayed.

Figure 4:
FIG. 4 is a diagram of another example of a benefit indication label.

On the discount label SL1, character information "US$0.5 off list price" indicating a discount amount concerning the commodity G is displayed. The benefit indication label only has to be a label affixed to the commodity G and indicating benefit content granted when the commodity G is purchased. Other examples of the benefit indication label include a discount label SL2 indicating a discount rate of the commodity G as shown in FIG. 4 and a point addition label SL3 indicating the number of points to be granted in addition as shown in FIG. 5. The benefit indication label may be represented in a logotype or the like.

Referring back to FIG. 2, the storing section 217 is a storage medium such as a HDD or a flash memory. The storing section 217 has stored therein a computer program 217*a* executable by the CPU 211 and various files. Examples of the computer program 217*a* stored in the storing section 217 include a computer program for control of the image pickup section 216, a computer program for code symbol reading, and a computer program for image and character recognition such as OCR (Optical Character Reader) or pattern matching. The storing section 217 has stored therein a label characteristic file 217*b* and an affixing position definition file 217*c* as files necessary for the operation of the commodity code reading apparatus 200.

The label characteristic file 217*b* is a data table in which characteristics of benefit indication labels and benefit contents indicated by the benefit indication labels are associated with each other. FIG. 6 is a diagram for explaining the label characteristic file 217*b*. As shown in the figure, the label characteristic file 217*b* has stored therein, in association with each other, label characteristic data indicating characteristics of characters and symbols included in benefit indication labels and benefit information, which serves as label information corresponding to the benefit indication labels, indicating benefit contents granted to commodities by the benefit indication labels.

More specifically, the label characteristic data is information extracted from the benefit indication labels by recognition processing such as pattern recognition or OCR. Concerning the discount label SL1 on which "US$0.5 off list price" is described as shown in FIG. 3, information "0.5, US$, off" is extracted by pattern recognition or character recognition processing as indicated by label characteristic data of No. 1 in the label characteristic file 217*b* shown in FIG. 6. Similarly, concerning the discount label SL2 and the point addition label SL3 shown in FIGS. 4 and 5, information concerning a discount and point addition "10, %, off" and "10, points" is extracted as indicated by label characteristic data of No. 2 and No. 3 shown in FIG. 6.

The benefit information means information obtained by converting information concerning benefit content such as a discount or point addition read from a benefit indication label into an alphanumerical value such that the information can be used in sales registration processing by the POS terminal 100. As shown in FIG. 6, benefit information "−US$0.5" meaning a discount of US$0.5 is stored in association with label characteristic data "0.5, US$, off". Benefit information "−10%" meaning a discount of 10% is stored in association with label characteristic data "10, %, off". Further, benefit information "+10P" meaning point addition of 10 points is stored in association with label characteristic data "10, points".

The affixing position definition file 217*c* is a file that stores data defining a relative positional relation between a code symbol (a barcode) affixed to the commodity G and a benefit indication label. The positional relation between the code symbol and the benefit indication label defined in the affixing position definition file 217*c* is a positional relation for setting a regular affixing position of the benefit indication label. An affixing-position determining section 224 explained later determines, on the basis of the positional relation defined in the affixing position definition file 217*c*, whether the benefit indication label is affixed to the regular position.

FIG. 7 is a schematic diagram of an example of data stored by the affixing position definition file 217*c*. In the figure, a relative positional relation between a presence position of a code symbol (hereinafter referred to as code position CP) and a presence position of a benefit indication label (hereinafter referred to as label position LP) is shown. The code position CP and the label position LP are arranged at a predetermined space apart substantially in parallel to each other. A data format of the affixing position definition file 217*c* is not specifically limited. For example, the affixing position definition file 217*c* may be image data representing a relative positional relation between the code symbol and the benefit indication label or may be numerical data representing the relative positional relation between the code symbol and the benefit indication label as a coordinate, a vector, or the like. The affixing position definition file 217*c* may be numerical data in which, with the presence position of one of the code symbol and the benefit indication label set as a reference, the presence position of the other is represented as a coordinate (a relative coordinate), a vector, or the like.

Characteristic functions of the commodity code reading apparatus 200 are explained below. The CPU 211 realizes, as shown in FIG. 2, an image-data capturing section 221, a code reading section 222, a label reading section 223, an affixing-position determining section 224, and an information output section 225 in cooperation with the computer programs stored by the ROM 212 and the storing section 217.

The image-data capturing section 221 outputs an image pickup ON signal to the image pickup section 216 to cause the image pickup section 216 to start an image pickup operation. The image-data capturing section 221 captures image data in the image pickup area 216*a* picked up by the image pickup section 216 and stores the image data in the RAM 213. If the image-data capturing section 221 receives an instruction of the label reading section 223, the image-data capturing section 221 captures image data in the image pickup area 216*a* picked up by the image pickup section 216 and stores the image data in the RAM 213.

The code reading section 222 detects an image of a barcode from the image data stored in the RAM 213 by the image-data capturing section 221 and performs barcode reading processing for reading a commodity code stored in the barcode. Specifically, the code reading section 222 binarizes image data of one frame stored in the RAM 213 and detects whether a data area concerning a barcode is present in the binarized data. If the code reading section 222 detects a data area concerning a barcode, the code reading section 222 decodes the barcode and reads decoded data as a commodity code of the commodity G. The code reading section 222 stores the read commodity code in the RAM 213.

The label reading section 223 performs label reading processing for detecting an image of a benefit indication label from image data of one frame stored in an image work area of the RAM 213 by the image-data capturing section 221. In the label reading processing, the label reading section 223 collates, through pattern recognition or OCR character recognition, characteristics of characters, a picture, a symbol, or the like included in a benefit indication label and the label characteristic data (see FIG. 6) of the label characteristic file 217*b*. If label characteristic data having a high degree of coincidence is detected, the label reading section 223 determines that a benefit indication label is detected. If an image of the benefit indication label is detected, the label reading section 223 reads benefit information corresponding to the detected label characteristic data from the affixing position definition file 217*c* and stores the read benefit information in the RAM 213.

The affixing-position determining section 224 specifies a relative positional relation between the barcode and the benefit indication label on the basis of a detection position of the barcode detected by the code reading section 222 from the image data of one frame captured by the image-data capturing section 221 and a detection position of the benefit indication label detected by the label reading section 223 from the image data.

The affixing-position determining section 224 compares the specified relative positional relation between the barcode and the benefit indication label and the positional relation between the code position CP and the label position LP defined in the affixing position definition file 217*c* and determines whether the positional relations coincide (or substantially coincide) with each other. If the affixing-position determining section 224 determines that the positional relations coincide with each other, the affixing-position determining section 224 determines that the benefit indication label is affixed in the regular position and causes the information output section 225 to transmit benefit information corresponding to the benefit indication label to the POS terminal 100.

On the other hand, if the affixing-position determining section 224 determines that the positional relations do not coincide with each other, the affixing-position determining section 224 determines that the benefit indication label is not affixed to the regular position and displays a message for informing to that effect on the operator display 203. The affixing-position determining section 224 displays, on the display 203, a screen for checking with the operator whether benefit information is transmitted and causes the information output section 225 to transmit the benefit information of the benefit indication label to the POS terminal 100 according to an instruction from the operator.

Figure 8:
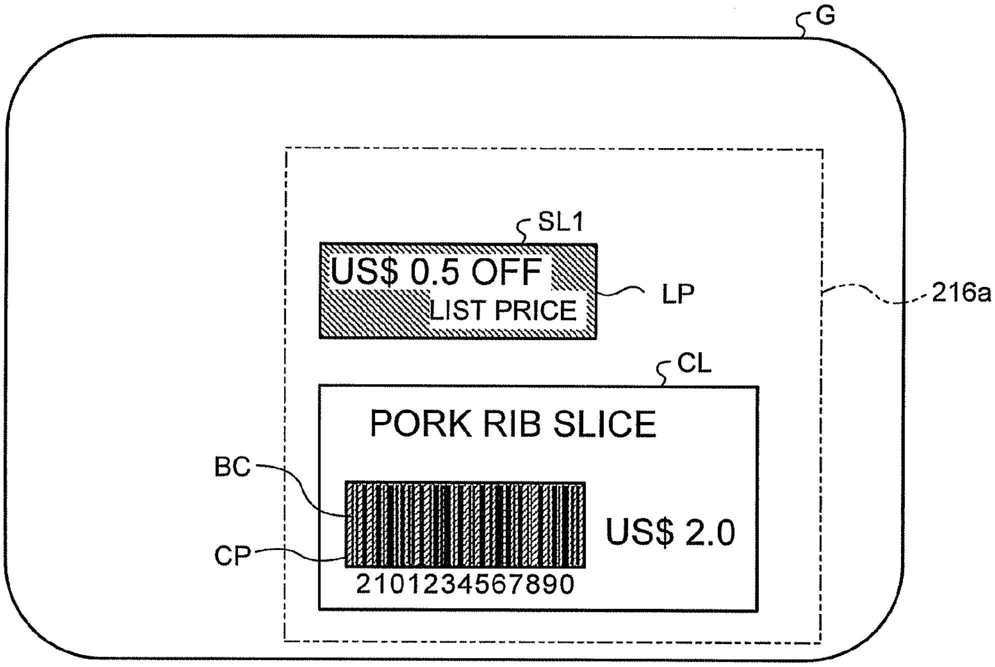
FIG. 8 is a diagram for explaining a positional relation between a barcode and a discount label affixed to a commodity and a positional relation between a code position and a label position defined in the affixing position definition file.
Figure 9:
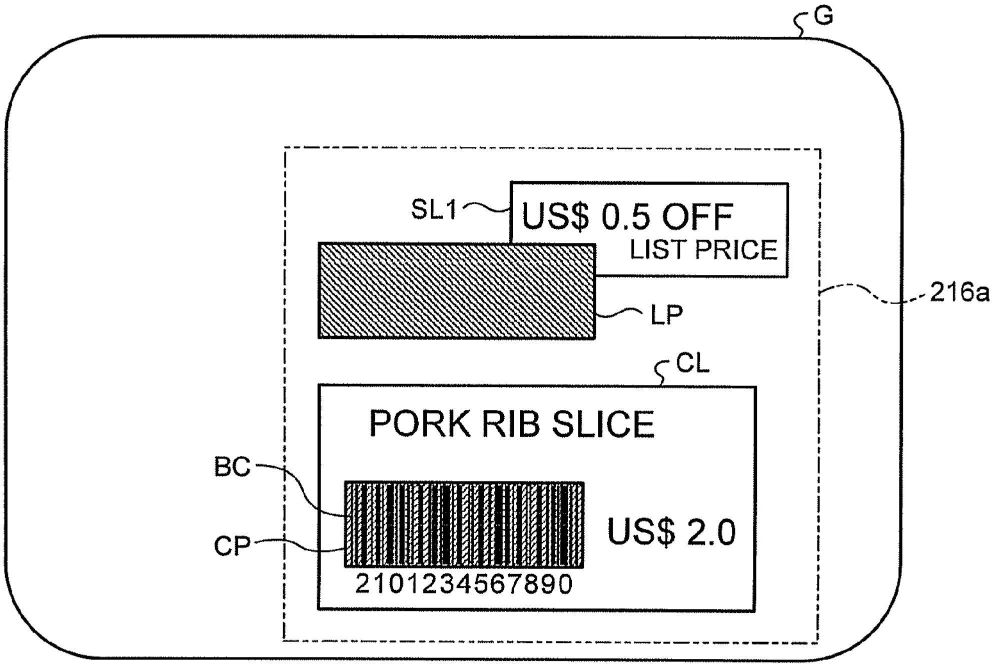
FIG. 9 is a diagram for explaining a positional relation between the barcode and the discount label affixed to the commodity and the positional relation between the code position and the label position defined in the affixing position definition file.

The operations of the affixing-position determining section 224 are explained below with reference to FIGS. 8 and 9. FIGS. 8 and 9 are diagrams for explaining a positional relation between the barcode BC and the discount label SL1 affixed to the commodity G and the positional relation between the code position CP and the label position LP defined in the affixing position definition file 217*c*. It is assumed that the barcode BC and the discount label SL1 are included in the same image pickup area 216*a*.

In FIG. 8, the positional relation between the barcode BC and the discount label SL1 coincides with the positional relation between the code position CP and the label position LP defined in the affixing-position definition file 217*c*. In this case, from a comparison result of a relative positional relation between the barcode BC and the discount label SL1 in the image pickup area 216*a* and the positional relation between the code position CP and the label position LP, the affixing-position determining section 224 determines that the positional relations coincide with each other. Therefore, the affixing-position determining section 224 causes the information output section 225 to transmit the benefit information (–US$0.5) read from the discount label SL1 to the POS terminal 100.

On the other hand, in FIG. 9, the positional relation between the barcode BC and the discount label SL1 does not coincide with the positional relation between the code position CP and the label position LP defined in the affixing position definition file 217*c*. In this case, from a comparison result of the relative positional relation between the barcode BC and the discount label SL1 in the image pickup area 216*a* and the positional relation between the code position CP and the label position LP, the affixing-position determining section 224 determines that the positional relations do not coincide with each other and suppresses transmission of the benefit information.

The affixing-position determining section 224 performs, while maintaining the relative positional relation between the code position CP and the label position LP defined in the affixing position definition file 217*c*, rotation and expansion or reduction of the entire code position CP and the entire label position LP to adjust the code position CP and the label position LP to a state in which the positional relation between the code position CP and the label position LP can be compared with a positional relation between the barcode BC and the discount label SL1, an image of which is actually picked up.

Referring back to FIG. 2, the information output section 225 transmits (outputs) the commodity code stored in the RAM 213 to the POS terminal 100 via the communication I/F 214. The information output section 225 transmits, according to the control by the affixing-position determining section 224, the benefit information stored in the RAM 213 to the POS terminal 100 together with the commodity code.

For example, as shown in FIG. 3, if the discount label SL1 for US$0.5 off is affixed to the commodity G, the label reading section 223 reads the benefit information "–US$0.5" corresponding to the discount label SL1 from the label characteristic file 217*b* shown in FIG. 6 and stores the benefit information in the RAM 213. Therefore, if transmission of the benefit information is instructed from the affixing-position determining section 224, the commodity code reading apparatus 200 transmits a set of the commodity code representing "2101234567890" read from the barcode BC and the benefit information representing "–US$0.5" to the POS terminal 100.

On the other hand, if the CPU 111 of the POS terminal 100 receives the commodity code from the commodity code reading apparatus 200, the CPU 111 reads a price and the like of a commodity corresponding to the commodity code referring to the PLU file 114*b*. Further, if the CPU 111 of the POS terminal 100 receives the benefit information together with the commodity code, the CPU 111 applies processing corresponding to benefit content represented by the benefit information to the commodity. For example, if the benefit information represents "–US$0.5", the CPU 111 discounts US$ 0.5 from a price read on the basis of a commodity master and performs sales registration of the commodity.

Figure 10:
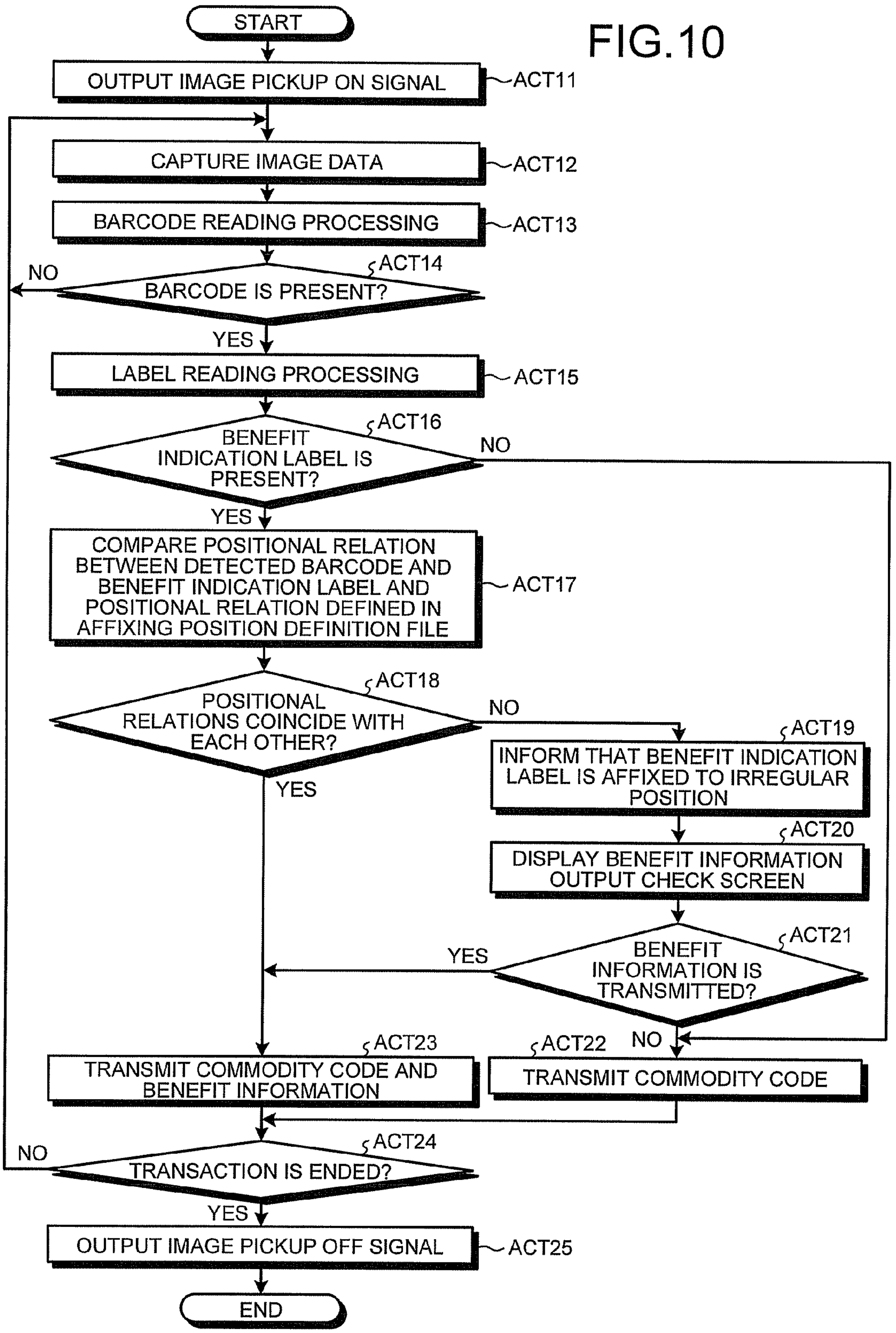
FIG. 10 is a flowchart for explaining a procedure of information output processing performed by the code reading apparatus.

The operations of the checkout system according to this embodiment are explained below with reference to FIG. 10. FIG. 10 is a flowchart for explaining a procedure of information output processing performed by the commodity code reading apparatus 200.

If a job start is instructed by a predetermined signal input from the POS terminal 100, the CPU 211 of the commodity code reading apparatus 200 starts information output processing. The image-data capturing section 221 outputs an image pickup ON signal to the image pickup section 216 and starts an image pickup operation by the image pickup section 216 (ACT 11). The image-data capturing section 221 captures image data picked up by the image pickup section 216 into the RAM 213 (ACT 12). The code reading section 222 starts the barcode reading processing explained above (ACT 13).

The code reading section 222 determines whether a barcode is detected in the barcode reading processing in ACT 13 (ACT 14). If a barcode cannot be detected (No in ACT 14), the CPU 211 returns to ACT 12. The code reading section 222 continues the image pickup by the image pickup section 216.

If a barcode is detected (Yes in ACT 14), the label reading section 223 starts label reading processing for the image data captured into the RAM 213 in ACT 12 (ACT 15). The label reading section 223 determines whether a benefit indication label is detected in the label reading processing in ACT 13 (ACT 16). If the label reading section 223 cannot detect a benefit indication label (No in ACT 16), the CPU 211 immediately shifts to ACT 22.

If the label reading section 223 detects a benefit indication label (Yes in ACT 16), the affixing-position determining section 224 compares a relative positional relation between an image of the barcode detected in the barcode reading processing in ACT 13 and an image of the benefit indication label detected in the label reading processing in ACT 15 and the positional relation between the code position CP and the label position LP defined in the affixing position definition file 217*c* (ACT 17). If the affixing-position determining section 224 determines that the positional relations coincide with each other (Yes in ACT 18), the affixing-position determining section 224 determines that the benefit indication label is affixed to the regular position and the CPU 211 shifts to ACT 23.

On the other hand, if the affixing-position determining section 224 determines that the positional relations do not coincide with each other (No in ACT 18), the affixing-position determining section 224 determines that the benefit indication label is not affixed to the regular position and displays a message for informing to that effect on the display 203 (ACT 19). Subsequently, the affixing-position determining section 224 displays a screen for checking with the operator of the commodity code reading apparatus 200 whether benefit information is transmitted (ACT 20) and stands by for an input from the operator (ACT 21).

Figure 11:
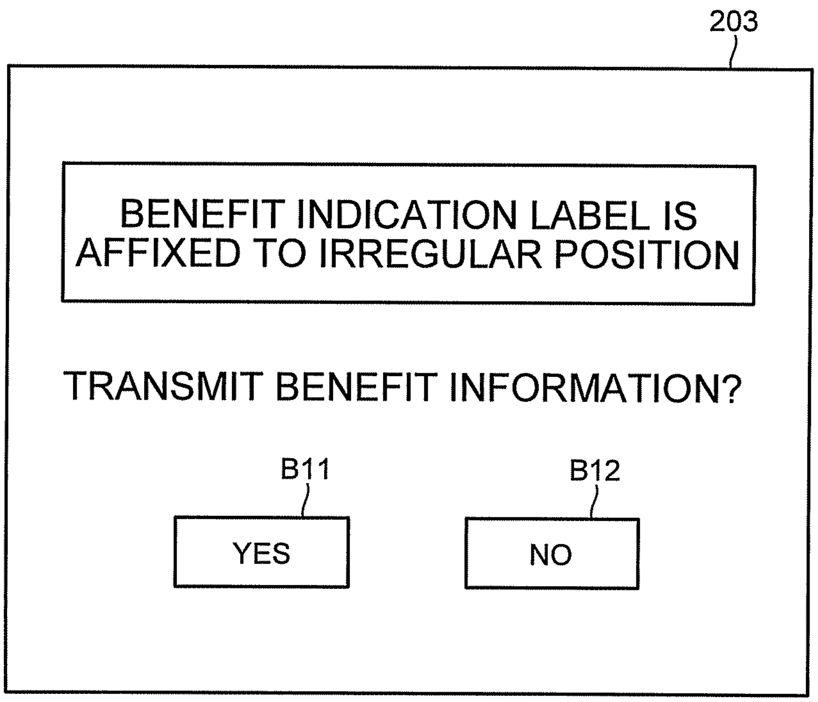
FIG. 11 is a diagram of an example of a screen displayed on an operator display of the code reading apparatus.

FIG. 11 is a diagram of an example of a display screen displayed in ACTS 19 and 20. As shown in the figure, a message for informing that the benefit indication label is affixed to the irregular position is displayed on the display 203. The operator who operates the commodity code reading apparatus 200 can easily grasp, according to the message displayed on the display 203, that the benefit indication label is not affixed to the regular position.

In FIG. 11, selection buttons B11 and B12 are buttons for instructing the commodity code reading apparatus 200 whether the benefit information is transmitted. The selection button B11 is a button for instructing the commodity code reading apparatus 200 to transmit the benefit information. The selection button B12 is a button for instructing the commodity code reading apparatus 200 not to transmit the benefit information. The selection buttons B11 or B12 is selected by the operation of the keyboard 202 or the touch panel.

Referring back to FIG. 10, if the affixing-position determining section 224 determines that non-transmission of the benefit information is instructed (No in ACT 21), the CPU 211 shifts to ACT 22. In ACT 22, the information output section 225 transmits the commodity code stored in the RAM 213 to the POS terminal 100 via the communication I/F 214 (ACT 22) and the CPU 211 shifts to ACT 24.

On the other hand, if the affixing-position determining section 224 determines that transmission of the benefit information is instructed (Yes in ACT 21), the affixing-position determining section 224 instructs the information output section 225 to transmit the benefit information. Subsequently, the information output section 225 transmits the commodity code and the benefit information stored in the RAM 213 to the POS terminal 100 via the communication I/F 214 (ACT 23) and the CPU 211 shifts to ACT 24.

In ACT 24, the CPU 211 determines whether the end of a transaction is instructed by a predetermined signal input from the POS terminal 100 (ACT 24). If the end of the transaction is not instructed (No in ACT 24), the CPU 211 returns to ACT and repeatedly executes ACTS 12 to 23 until sales registration of all commodities is completed. If the end of the transaction is instructed (Yes in ACT 24), the image-data capturing section 221 outputs an image pickup OFF signal to the image pickup section 216 and stops the image pickup operation by the image pickup section 216 (ACT 25). Thereafter, the CPU 211 ends the processing.

As explained above, with the commodity code reading apparatus 200 according to this embodiment, the relative positional relation between the code symbol and the benefit indication label included in the image data picked up by the image pickup section 216 and the positional relation defined in the affixing-position definition file 217*c* are compared to determine whether the benefit indication label is affixed to the regular position. Therefore, it is possible to detect a benefit indication label affixed to an irregular position.

If it is determined that the positional relations do not coincide with each other, it is checked with the operator whether information is transmitted. If an instruction to transmit the benefit information is received, the commodity code and the benefit information are transmitted. Therefore, it is possible to provide benefit content corresponding to the benefit information.

The embodiment of the present invention is explained above. However, the present invention is not limited to this. Various changes, replacements, additions, and the like are possible without departing from the spirit of the present invention.

For example, in the embodiment, if the relative positional relation between the code symbol and the benefit indication label does not coincide with the positional relation defined in the affixing position definition file 217*c*, it is checked with the operator of the commodity code reading apparatus 200 whether benefit information corresponding to the benefit indication label is transmitted. However, the present invention is not limited to this . The CPU 211 may immediately shift to ACT 22 after ACT 19 to omit the check with the operator.

In the embodiment, one affixing position definition file 217*c* is applied to all commodities. However, the present invention is not limited to this. For example, if the affixing-position definition file 217*c* is prepared for each type of a commodity or each benefit condition represented by a benefit indication label, it is possible to properly use the affixing position definition file 217*c* for each type of a commodity or each benefit content.

If the affixing position definition file 217*c* is prepared for each type of a commodity, a type of a commodity is specified from the commodity code stored in the barcode read in ACT 13. Act 17 is performed using the affixing position definition file 217*c* corresponding to the type. If the affixing position definition file 217*c* is prepared for each benefit content, ACT 17 is performed using the affixing position definition file 217*c* corresponding to benefit content represented by the benefit indication label detected in ACT 16.

The computer programs executed in the POS terminal 100 and the commodity code reading apparatus 200 according to the embodiment may be provided while being recorded in a computer-readable recording medium such as a CD-ROM (Compact Disc Read Only Memory), a flexible disk (FD), a CD-R (Compact Disc Recordable), or a DVD (Digital Versatile Disk) as a file of an installable format or an executable format.

The computer programs executed in the POS terminal 100 and the commodity code reading apparatus 200 according to the embodiment may be provided while being stored on a computer connected to a network such as the Internet and downloaded through the network. The computer programs executed in the POS terminal 100 and the commodity code reading apparatus 200 according to the embodiment may be provided or distributed through the network such as the Internet.

What is claimed is:

1. A commodity code reading apparatus comprising:

an image capturing section configured to capture an image picked up by an image pickup section;

a code detecting section configured to detect a code symbol from an image of a commodity captured by the image capturing section;

a label detecting section configured to detect a label affixed to the commodity from the image of the commodity captured by the image capturing section;

a determining section configured to determine whether a relative positional relation between a detection position of the code symbol and a detection position of the label in the image coincides with a positional relation set in advance; and a transmitting section configured to transmit, if the determining section determines that the positional relations coincide with each other, code information stored in the code symbol to an external apparatus together with label information corresponding to the label.

2. The apparatus according to claim 1, wherein benefit content related to purchase of a commodity affixed with the label is represented on the label, and the transmitting section transmits, as the label information, the benefit content represented by the label.

3. The apparatus according to claim 1, wherein, if the determining section determines that the positional relations do not coincide with each other, the transmitting section transmits the code information.

4. The apparatus according to claim 1, further comprising an informing section configured to inform, if the determining section determines that the positional relations do not coincide with each other, that the label is affixed to an irregular position.

5. The apparatus according to claim 4, wherein, if the instruction receiving section receives an instruction not to transmit the label information, the transmitting section transmits the code information.

6. The apparatus according to claim 1, further comprising an instruction receiving section configured to check with an operator, if the determining section determines that the positional relations do not coincide with each other, whether the label information is transmitted and receive an instruction from the operator, wherein if the instruction receiving section receives an instruction to transmit the label information, the transmitting section transmits the label information together with the code information.

7. The apparatus according to claim 1, wherein the determining section determines, on the basis of the definition file representing a relative positional relation between the code symbol and the label set as a regular positional relation, whether the relative positional relation between the detection position of the code symbol and the detection position of the label in the image coincides with a positional relation defined in the definition file.

8. The apparatus according to claim 7, wherein the definition file is prepared for each type of the commodity, and the determining section uses the definition file corresponding to a type of a commodity specified from the code information stored in the code symbol.

9. The apparatus according to claim 7, wherein the definition file is prepared for each type of the benefit content, and the determining section uses the definition file corresponding benefit content represented by the label.

10. A commodity code reading method comprising:

capturing an image picked up by an image pickup section;

detecting a code symbol from an image of a commodity captured in the capturing;

detecting a label affixed to the commodity from the captured image of the commodity;

determining whether a relative positional relation between a detection position of the code symbol and a detection position of the label in the image coincides with a positional relation set in advance; and transmitting, if it is determined that the positional relations coincide with each other, code information stored in the code symbol to an external apparatus together with label information corresponding to the label.

* * * * *